US00RE40877E

(19) United States
(12) Reissued Patent
Singhal et al.

(10) Patent Number: US RE40,877 E
(45) Date of Reissued Patent: Aug. 18, 2009

(54) METHOD OF COMMUNICATING DATA IN AN INTERCONNECT SYSTEM

(75) Inventors: Ashok Singhal, Redwood City, CA (US); David J. Broniarczyk, Mountain View, CA (US); George R. Cameron, Capitola, CA (US); Jeff A. Price, Pleasanton, CA (US)

(73) Assignee: 3PAR, Inc., Fremont, CA (US)

(21) Appl. No.: 12/171,191

(22) Filed: Jul. 10, 2008

Related U.S. Patent Documents

Reissue of:
(64) Patent No.: 6,973,484
Issued: Dec. 6, 2005
Appl. No.: 09/751,994
Filed: Dec. 29, 2000

(51) Int. Cl.
*G06F 15/167* (2006.01)

(52) U.S. Cl. ..... 709/216; 711/141; 711/150; 711/113; 714/6

(58) Field of Classification Search ..... 709/216; 711/141, 150, 113; 714/6
See application file for complete search history.

(56) References Cited

U.S. PATENT DOCUMENTS 6,353,898 B1 * 3/2002 Wipfel et al. ..... 714/48
6,374,331 B1 * 4/2002 Janakiraman et al. ..... 711/141
6,415,364 B1 * 7/2002 Bauman et al. ..... 711/155
6,513,142 B1 * 1/2003 Noya ..... 714/803
6,633,958 B1 * 10/2003 Passint et al. ..... 711/141
6,973,484 B1 * 12/2005 Singhal et al. ..... 709/216
2001/0044883 A1 * 11/2001 Abe et al. ..... 711/150
2004/0015657 A1 * 1/2004 Humlicek et al. ..... 711/114

OTHER PUBLICATIONS

Cardoza et al., "Design of the TruCluster Multicomputer System for the Digital UNIX Environment", Digital Technical Journal, vol. 8, No. 1, pp. 5–17 (1996).*
EMC Corporation, "Symmetrix 3000 and 5000 ICDA Description Guide", EMC$^2$, pp. 1–48 (1997).*
Network Appliance, "Clustered Failover Solution: Protecting Your Environment", NetApp Filers, pp. 1–11, Feb. 11, 2000.*

* cited by examiner

*Primary Examiner*—Jungwon Chang
(74) *Attorney, Agent, or Firm*—Patent Law Group LLP; David C. Hsia

(57) ABSTRACT

A method is provided for communicating data in an interconnect system comprising a plurality of nodes. In one aspect, the method includes: issuing a command packet from a first node, the command packet comprising a respective header quadword and at least one respective data quadword for conveying a command to a second node, wherein the command is selected from a group comprising a direct memory access (DMA) command, an administrative write command, a memory copy write command, and a built in self test (BIST) command; receiving the command packet at the second node; issuing an acknowledgement packet from the second node, the acknowledgement packet comprising a respective header quadword for conveying an acknowledgement that the command packet has been received at the second node.

4 Claims, 4 Drawing Sheets

METHOD OF COMMUNICATING DATA IN AN INTERCONNECT SYSTEM

Matter enclosed in heavy brackets [ ] appears in the original patent but forms no part of this reissue specification; matter printed in italics indicates the additions made by reissue.

CROSS REFERENCE TO RELATED APPLICATION

This application is related to the subject matter disclosed in U.S. patent application Ser. No. 09/633,088, entitled "Data Storage System," filed on Aug. 4, 2000, now U.S. Pat. No. 6,658,478, and U.S. patent application Ser. No. 09/751,649, entitled "Communication Link Protocol Optimized for Storage Architectures", filed simultaneously herewith on Dec. 29, 2000, both of which are assigned to the present Assignee and are incorporated herein by reference.

TECHNICAL FIELD OF THE INVENTION

The present invention relates generally to the field of data storage and, more particularly, to a method of communicating data in an interconnect system.

BACKGROUND OF THE INVENTION

In the context of computer systems, enterprise storage architectures provide mass electronic storage of large amounts of data and information. The frenetic pace of technological advances in computing and networking infrastructure—combined with the rapid, large-scale sociological changes in the way these technologies are used—has driven the transformation of enterprise storage architectures faster than perhaps any other aspect of computer systems. This has resulted in various arrangements for storage architectures which attempt to meet the needs and requirements of complex computer systems.

A number of these arrangements may utilize a technique referred to as clustering. With clustering, access for reading/writing data into and out of mass data storage (e.g., tape or disk storage) is provided by a cluster of computers. Each computer may be considered a "node." The nodes are used to improve performance in a storage architecture by performing various, independent tasks in parallel. Furthermore, the nodes in the cluster provide redundancy. Specifically, in the event that one node fails, another node may take over the tasks of the failed node.

In a clustering technique, the various nodes must communicate with each other to support the functionality described above. This communication between nodes is provided by cluster interconnects. Previously developed cluster interconnects include standard network connections (e.g., Ethernet), storage interconnections (e.g., Fibre Channel), and specialized network connections (e.g., SERVER-NET from Tandem/Compaq and MEMORY CHANNEL from Digital Equipment Corporation/Compaq). Such previously developed cluster interconnects, and the associated protocols, are suitable for "general purpose" clusters.

However, for high-performance clusters, such as those implemented with RAID (Redundant Array of Inexpensive/Independent Disks) controllers, the previously developed cluster interconnects and associated protocols are inadequate or otherwise problematic. For example, these previously developed cluster interconnects and associated protocols do not provide sufficient bandwidth to fully realize the potential of high-performance clusters. Furthermore, the previously developed cluster interconnects and associated protocols require a significant software overhead, which reduces the processing power otherwise available for memory storage access.

SUMMARY OF THE INVENTION

In one embodiment, the present invention provides a method of communication using an associated protocol which optimizes or improves the performance of a specialized storage system architecture with a cluster configuration.

According to an embodiment of the present invention, a method is provided for communicating data in an interconnect system comprising a plurality of nodes. The method includes: issuing a command packet from a first node, the command packet comprising a respective header quadword and at least one respective data quadword for conveying a command to a second node, wherein the command is selected from a group comprising a direct memory access (DMA) command, an administrative write command, a memory copy write command, and a built in self test (BIST) command; receiving the command packet at the second node; issuing an acknowledgement packet from the second node, the acknowledgement packet comprising a respective header quadword for conveying an acknowledgement that the command packet has been received at the second node.

According to another embodiment of the present invention, a method is provided for communicating data in an interconnect system which comprises a plurality of nodes. Each node has a respective memory comprising a plurality of lines, each line being the same predetermined size. The method includes: providing new data for writing into a portion of a particular line of memory located at a local node; reading out existing data from the particular line of memory located at the local node; merging the new data with the existing data; writing the merged data into the particular line of memory at the local node; and transferring the merged data over a communication link to a remote node for writing into memory located at the remote node.

According to yet another embodiment of the present invention, a method is provided for communicating data in an interconnect system comprising a plurality of nodes, each node having a respective memory. The method includes: calculating the parity of a local block at a local node; and performing a direct memory access (DMA) operation to write the calculated parity to the memory of a remote node, without previously writing the calculated parity to the memory of the local node.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments for the present invention and their advantages are best understood by referring to FIGS. 1 through 4 of the drawings. Like numerals are used for like and corresponding parts of the various drawings.

Environment for a Data Storage System

Figure 1:
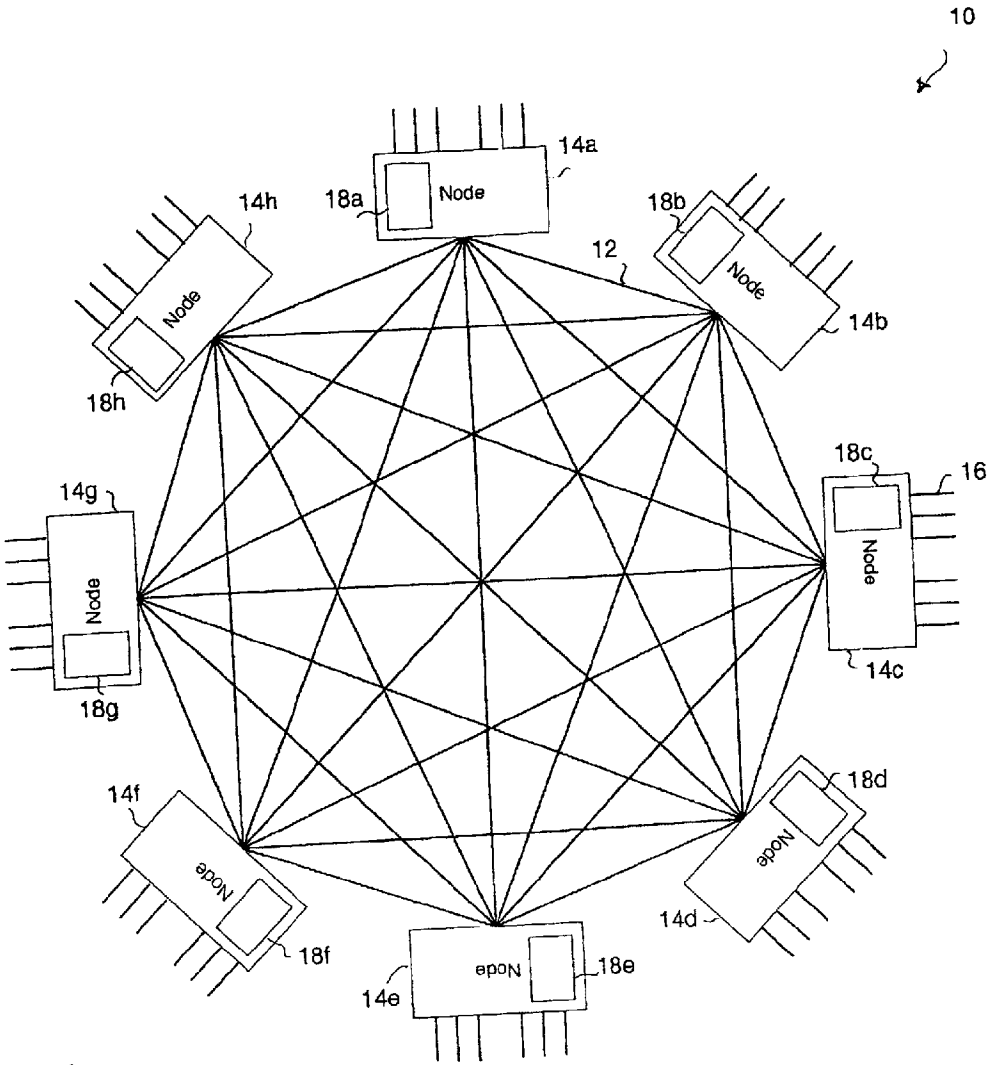
FIG. 1 illustrates an interconnect system within which a communication link protocol and associated methods, according to embodiments of the present invention, may be utilized.

FIG. 1 illustrates an interconnect system 10 within which a communication link protocol and associated methods, according to embodiments of the present invention, may be utilized. Interconnect system 10 may be incorporated into a data storage system which provides mass storage for data and information. Such a data storage system is described in U.S. application Ser. No. 09/633,088, entitled "Data Storage System," filed on Aug. 4, 2000, now U.S. Pat. No. 6,658,478, the entirety of which is incorporated by reference herein. In general, interconnect system 10 functions to support communication in the data storage system.

Interconnect system 10 may include a number of processing nodes 14, which are separately labeled as 14a, 14b, 14c, 14d, 14e, 14f, 14g, and 14h. Nodes 14 comprise hardware and software for performing the functionality described herein. Each node 14 generally functions as a point of interface/access for one or more host devices (e.g., a server cluster, a personal computer, a mainframe computer, a printer, a modem, a router, etc.) and storage devices (e.g., tape storage or disk storage). For this purpose, in one embodiment, each node 14 may include one or more peripheral component interconnect (PCI) slots, each of which supports a respective connection 16. For clarity, only one connection 16 is labeled in FIG. 1. Each connection 16 can connect a host device or a storage device. Connections 16 can be small computer system interface (SCSI), fibre channel (FC), fibre channel arbitrated loop (FCAL), Ethernet, Infiniband, or any other suitable connection.

Each node 14 can be implemented as a system board on which is provided suitable central processing unit (CPU) devices, memory devices, and application specific integrated circuit (ASIC) devices for providing the functionality described herein. This system board can be connected on a backplane connector which supports communication paths with other nodes.

Each node 14 may include its own separate cluster memory 18, which are separately labeled as 18a, 18b, 18c, 18d, 18e, 18f, 18g, and 18h. Each cluster memory 18 buffers the data and information which is transferred through the respective node 14. Each cluster memory 18 can also serve to buffer the data/information transferred through one or more other nodes 14. Thus, taken together, cluster memory 18 in the nodes 14 is used as a cache for reads and writes. Cluster memory 18 can be implemented as any suitable cache memory, for example, synchronous dynamic random access memory (SDRAM).

In one embodiment, each cluster memory 18 may be programmed or divided into multiple regions. Each region may comprise one or more lines of memory. These lines of memory can each be of the same predetermined size. In one embodiment, each line can comprise or contain sixty-four bytes. Each line of memory may hold a predetermined number of quadwords (described below). In one embodiment, each access of memory occurs over multiple cycles to retrieve a line of data. Each region can be associated with one or more regions at respective remote nodes 14. Each node 14 may be configured so that the writing of data into a particular region of cluster memory 18 causes the same data, along with the rest of the line containing the data, to be sent to a remote node, where the line is written to the corresponding region of the remote node's cluster memory. In one implementation, a separate "broadcast" region may be provided in each cluster memory 18. Data in each such broadcast region is copied to all other nodes. However, data in other regions of cluster memory 18 may be copied to exactly one other node (not multiple nodes). Accordingly, the data is "mirrored" at the cluster memories 18 of remote nodes 14.

Communication links 12 (only one of which is labeled for clarity) convey data/information between nodes 14, thereby connecting nodes 14 together. As shown, communication links 12 connect any given node 14 with every other node 14 of interconnect system 10. That is, for any given two nodes 14, a separate communication link 12 is provided. As such communication links 12 may provide a fully-connected crossbar between all nodes 14 of interconnect system 10. Control of data/information transfers over each communication link 12 is shared between the two respective nodes 14.

Each communication link 12 may be implemented as a pair of high-speed, uni-directional links (one in each direction) having high bandwidth to provide rapid transfer of data and information between nodes 14. In one embodiment, each communication link 12 can operate at 133 MHz in each direction with data sampled on both edges of the clock, thereby effectively operating at 266 MHz. Each link can be two-bytes wide, for a total bandwidth of 1,064 MB/s per link. In one embodiment, transfers of data/information over communication links 12 are checked by an error-correcting code (ECC) that can detect a single bit error in a quadword (described herein) as well as any line error on communication links 12.

The communication link protocol and associated methods, according to embodiments of the present invention, optimize the communication of data and information within interconnect system 10, as described herein. This communication link protocol may support a variety of communication between nodes 14 via communication links 12. This may include communication for a direct memory access (DMA) engine write, a memory copy write, an administrative write, and a built in self test (BIST).

In a communication for DMA engine write, a DMA engine on a local node 14 may cause a block of data to be written to the cluster memory at a remote node 14. In one embodiment, the DMA engine computes a function (e.g., "exclusive OR" (XOR) or parity) yielding a result which identifies a particular data block. The DMA engine then writes the data block over the appropriate communication link 12 to the cluster memory 18 of the desired remote node 14. In one embodiment, a pointer in the remote node 14 may be incremented with the DMA engine write so that the data may be treated as if entered in a queue. The local and/or the remote nodes 14 can be automatically interrupted after the operation for a DMA engine write is performed.

In one embodiment, for a DMA engine write, rather than copying data from a local memory location to a remote memory location, the data that is written to the remote node 14 can be computed, for example, by computing parity over multiple blocks of data on the local node 14. This can eliminate one entire operation in some cases. That is, if the same function was to be performed in previously developed systems, parity of the local blocks must first be calculated and then saved in local memory. Next, the computed parity from local memory is transferred (as a DMA operation) to the remote node as a separate operation. With the communication for DMA engine write (in accordance with an embodiment of the present invention, parity of the local blocks can be calculated (or computed) and transferred (as a DMA operation) to the remote node, thus saving an extra write operation to memory and an extra read operation from memory.

In a communication for a memory copy write, when data (e.g., a two-byte word) is written into a region of cluster memory 18 at a local node 14, that data alone is not sent to a remote node for mirroring. Instead, the existing data of an entire line (e.g., a memory line of sixty-four bytes) is read from the cluster memory, the new data for the word is merged into the existing data, and the merged data is written back to the memory region and also sent over a communication path 12 to the remote node 14. This is described in more detail below.

In a communication for an administrative write, a local node 14 writes data to registers on a remote node 14 for administrative purposes. Administrative writes are used for quick, low-overhead messages that do not require a lot of data. For example, an administrative write may be used to handle flow control of messages sent by the normal DMA engine (to determine how much space is available at the other end). As another example, an administrative write may be used to signal a remote node to perform some action for the purpose of debugging. The remote node 14 can be interrupted as well.

In a communication for a built in self test (BIST), a local node 14 may test the functionality of a remote node 14 over a communication link 12. Data and information may be communicated between the nodes to maintain or update the status of such functionality. This may occur automatically at regular intervals. In one embodiment, the BIST communication tests the functionality of the hardware of the target remote node 14, as described below.

For each type of communication, a separate inter-node command may be provided. Thus, there may be commands for DMA engine write, a memory copy write, an administrative write, and a built in self test (BIST). In general, each of these commands functions to initiate the associated communication between nodes 14. Other commands may be provides as well. One such command can be an idle command, which functions to place the communication link 12 in an idle state.

Commands are issued from one node 14 to another node 14. For each command, an acknowledgement may be issued in return by the node which receives the command. The node 14 which sends the command may be referred to as the "master," and the node 14 that responds with the acknowledgement may be referred to as the "slave." A slave node 14 is not required to send acknowledgements in the same order as the corresponding commands. That is, acknowledgements for a plurality of commands of the same or different type may arrive in a different order than the corresponding commands.

In a link protocol of the present invention, data and control information is transferred over individual communication links 12 in the form of packets. There can be two kinds of packets: command packets and acknowledgement packets. A command packet is sent from a master node 14 to a slave node 14 to convey a particular command (e.g., DMA engine write, memory copy write, administrative write, or built in self test (BIST)). An acknowledgment packet is sent from a slave node 14 to a master node 14 to convey an acknowledgement that a particular command was received. In one embodiment, all packets of a particular type are a fixed size. For example, all command packets may have a header (comprising a particular number of bits) and the same number of bits of information or data. All acknowledgement packets may have a header (comprising a particular number of bits) and no bits of data.

Command packets and acknowledgement packets may carry information for one or more flags which are used during communication for respective commands and acknowledgements. In general, these flags can support various features. For example, for a DMA engine write, command flags can support a counter at a remote node 14. This counter can implement a queue at the remote node 14. The queue functions to keep track of commands that are received at the remote node 14 so that such commands can be handled according to the order in which they are received. One command flag can be used to increment the counter, and another command flag can be used to reset the counter. As another example, for a memory copy write, a command flag can be used to indicate that data being written into cluster memory 18 at one node 14 is to be broadcast to all other nodes 14. Hardware and/or software at each node 14 interprets these flags to accomplish the desired operations. Acknowledgement flags may carry information about the status of a communication link 12 or a remote node 14. An acknowledgement flag can be used to indicate, for example, that a correctable/uncorrectable ECC error has occurred, that a protocol error has occurred, that a BIST error has occurred, that a protection violation has occurred, or that there is an overflow of data/information.

According to the link protocol and associated methods, all communication over links 12 occurs using pairs of packets. Each such pair of packets includes a command packet followed by an acknowledgment packet. A command packet is considered to be "outstanding" if the master node 14 has not received the corresponding acknowledgement packet from the slave node 14. The number of outstanding packets on a link depends on the command type. The number of outstanding packets which may be allowed on a communication link 12 for each type of command is given in Table 1 below.

TABLE 1

Outstanding Packets

| Command Type | Number of Outstanding Packets |
|---|---|
| Built In Self Test (BIST) | 1 |
| Administrative Write | 2 |
| Memory Copy Write | 4 |
| DMA Engine Write | 4 |

Each packet may comprise a header, data, and other information. Within each packet, bits of data/information may be grouped in units of a predetermined size. Each unit of a predetermined size can be referred to as a "quadword." In one embodiment, each quadword may comprise sixty-four bits of data, plus eight bits of error-correcting code (ECC). The sixty-four bits of data can be readily checked with the error correction provided by the eight ECC bits, as further described herein. In one embodiment, each command packet comprises one quadword for a header followed by either one or eight quadwords for data. Each acknowledgment packet may comprise one quadword for a header.

Each header for a command packet or an acknowledgement packet comprises a variety of information and data for coordinating or completing the desired communication. This may include, for example, the address of a cluster memory 18 at which data should be written, an offset from a base address of cluster memory 18, the type of packet (e.g., command or acknowledgement), the type of command (e.g., DMA engine write, (BIST)), a tag which allows the association between an acknowledgement and corresponding command, and one or more flags for commands/acknowledgements. An exemplary transfer for information/data of a packet header is described with reference to Tables 4 through 7 below.

With the link protocol and associated methods of the present invention, the transfer of data/information in units of quadwords provides a technical advantage. Because quadwords have the same predetermined size (e.g., sixty-four bits of data, plus eight bits of ECC), the link protocol may handle equal-sized packets for much of the communication between nodes 14, and thus, there is no need to encode data sizes, byte-enables, and other complexities associated with data/information which is transferred in variable sizes. As such, each communication link 12 may provide a low latency communication channel between nodes 14 without the protocol overhead of previously developed protocols, such as, for example, transmission control protocol/internet protocol (TCP/IP) or Fibre Channel protocol. The link protocol is thus optimized for large block transfer operations, thereby providing very efficient communication between nodes.

In one embodiment, for a DMA engine write, the data that is written to the remote node 14 can be computed (e.g., parity over multiple blocks of data is computed on the local node 14), rather than merely copied from some local memory location to a remote memory location. That is, the parity of the local blocks is calculated and the computed result is directly written to the memory (in a DMA operation) to the remote node. This potentially saves one extra write to memory and one extra read from memory, in addition to requiring fewer steps to perform, thereby providing a technical advantage.

The link protocol supports testing, from a local node 14, of the functionality of both hardware and software at a remote node 14. In one embodiment, this is accomplished with two forms of communication: a link hardware test and a link software test. The link hardware test, which can be implemented as a built in self test (BIST), tests the hardware at the remote node 14. The link software test, which can be implemented as a link "watchdog," tests the software at the remote node 14. In an operation for a link BIST, a local node 14 issues a BIST communication, via communication link 12, to the hardware at a remote node 14. If such hardware returns a suitable acknowledgement in response, the local node 14 is informed that the hardware of the remote node 14 is functioning properly. In an operation for a link watchdog, software at a remote node 14 is required to periodically write or update a particularly flag bit, which may be transmitted with each acknowledgement issued by the remote node 14. If this acknowledgement flag does not have a suitable setting, then a local node 14 receiving the acknowledgment will know that the software at the remote node 14 is not functioning properly.

Furthermore, if nodes 14 are implemented as system boards coupled to a backplane connector, A backplane connector differs from a general network connection in which packets of data/information are generally expected to be lost during "normal" operation, thus requiring a significant amount of protocol complexity (e.g., retransmission and complex error-handling procedures). In a backplane connector, the probability of single-bit errors is very small, thus allowing for utilization of an error correcting code (ECC) which is relatively simple. This ECC can be similar to that in utilized in memory systems. More serious errors are not expected during "normal" operation of a backplane connector, and thus, only need to be addressed generally if a system has failed or is broken.

Communication Link

Figure 2:
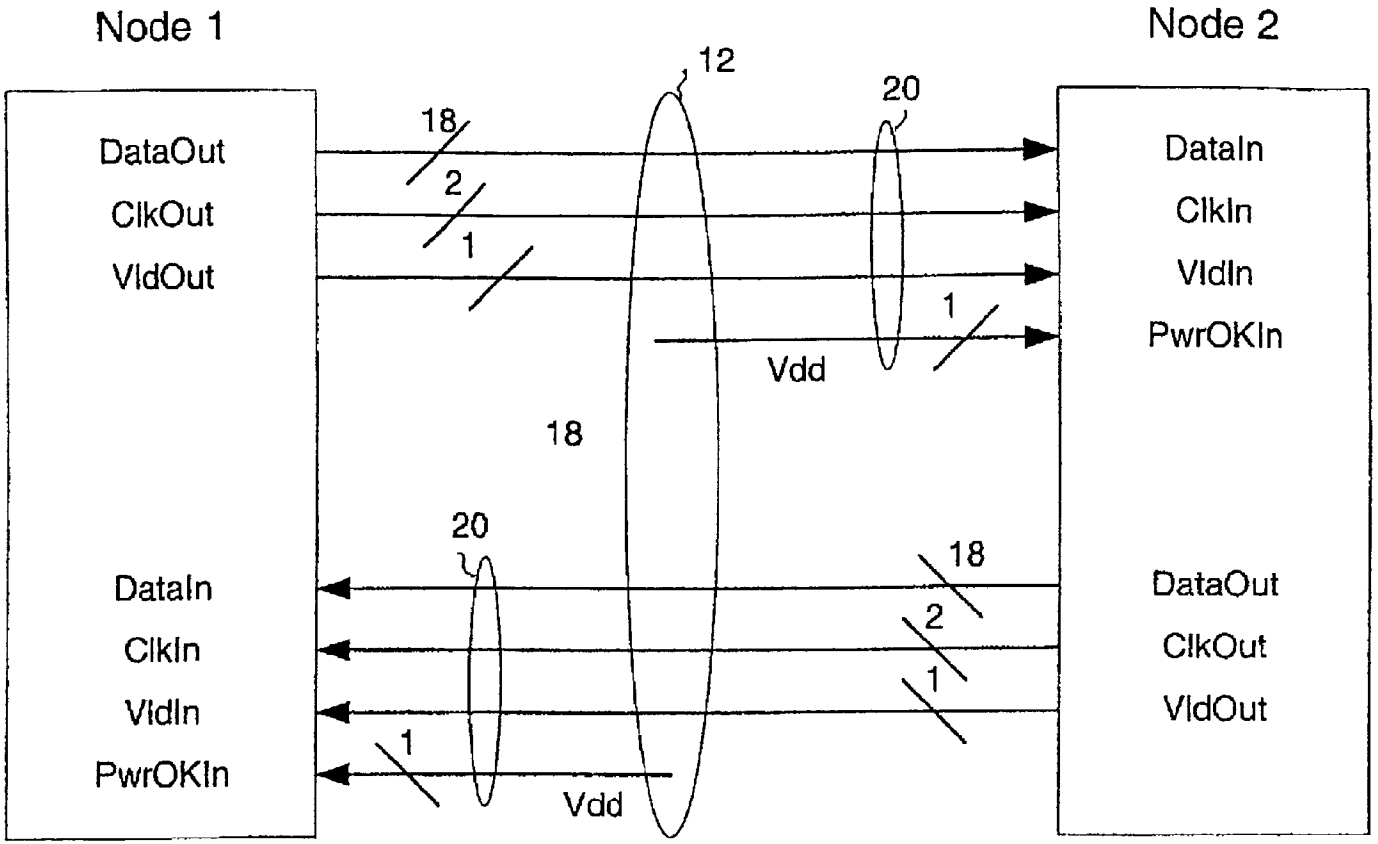
FIG. 2 illustrates an exemplary implementation for a communication link between two nodes, according to an embodiment of the present invention.

FIG. 2 illustrates an exemplary implementation for a communication link 12 between two nodes 14, according to an embodiment of the present invention. Each node 14 may send data/information out to and receive data/information from the other node 14. Each node 14 has its own clock. While these clocks are preferably the same, the clocks may not be synchronous to each other and may have some drift between them.

As depicted, communication link 12 may include a pair of uni-directional links 20. Each uni-directional link 20 supports communication in one direction between the two nodes 14. Each uni-directional link 20 supports a number of link signals for communicating information and data from one node to the other. For each uni-directional link 20, these link signals include a data (Data) signal, a clock (Clk) signal, and a valid (Vld) signal.

Because each link 20 is uni-directional, each data signal may be constitute a "DataOut" signal for the node 14 at which the data signal originates and a "DataIn" signal for the node 14 at which the signal is received. Likewise, each clock signal may be constitute a "ClkOut" signal for the node 14 at which the clock signal originates and a "ClkIn" signal for the node 14 at which the signal is received. Similarly, each valid signal may be constitute a "VldOut" signal for the node 14 at which the valid signal originates and a "VldIn" signal for the node 14 at which the signal is received.

The data signal is used for communicating data between nodes 14. Each uni-directional link 20 provides an eighteen-bit wide data path for the data signal. In one embodiment, two bytes (sixteen bits) may be provided for data, and two bits may be provided for an error-correcting code (ECC). Thus, to transfer a quadword comprising sixty-four bits of data and eight bits of ECC between nodes 14, four clock cycles are required, as shown and described below in more detail with reference to FIG. 3.

The clock signal is used to carry the clock of the transmitting node 14 to a receiving node 14. This is done because each uni-directional link 20 may be source-synchronous. That is, data is sampled at the receiving node 14 using the clock of the transmitting node 14, and thereafter, re-synchronized with the clock of the receiving node. Because it is possible for the clock of a transmitting node to be faster than the clock of a receiving node, in one embodiment, padding cycles may be occasionally inserted into the transferred data, thus allowing the receiving node to catch up. Each uni-directional link 20 may provide a two-bit wide data path for the clock signal.

The valid signal is used to distinguish between the different parts (e.g., header, data, or padding) in a command or acknowledgement packet. Parity may be encoded in the valid signal. Each uni-directional link 20 may provide a one-bit wide data path for the valid signal. The valid signal may use both edges of the clock signal (for each clock cycle) to convey meaning. Exemplary values for the valid signal, as used to convey meaning, are provided in Table 2 below.

TABLE 2

| Cycle Identification | |
|---|---|
| Vld (rising, falling) | Cycle Meaning |
| (0, 0) | Padding cycle, dropped by receiving node. |
| (0, 1) | First cycle of packet, loaded by receiving node. |

TABLE 2-continued

| Cycle Identification | |
|---|---|
| Vld (rising, falling) | Cycle Meaning |
| (1, 0) | Valid cycle, with running INV parity = 0, loaded by receiving node. |
| (1, 1) | Valid cycle, with running INV parity = 1, loaded by receiving node. |

An exemplary signal protocol for the link signals (i.e., data signal, clock signal, and valid signal) is provided in Table 3 below.

TABLE 3

| Signal Protocol | | | |
|---|---|---|---|
| Name | Width | Direction | Description |
| DataIn | 18 | Input | Data + ECC in from communication link. |
| ClkIn | 2 | Input | Differential clock in from communication link. |
| VldIn | 1 | Input | Valid signal for incoming data used for re-synchronization with clock of receiving node. |
| InvIn | 1 | Input | If "1", the DataIn should be inverted to obtain the actual value of data. Data may be inverted to minimize the number of signals that are switching in any given cycle. |
| PowerOK | 2 | Input | Indicates that the other end of the communication link has power. |
| DataOut | 18 | Output | Data + ECC to communication link. |
| ClkOut | 2 | Output | Differential clock out to communication link. |
| VldOut | 1 | Output | Valid signal for outgoing data. |
| InvOut | 1 | Output | Indicates whether DataOut is inverted. |

With this signal protocol, each edge of the clock transfers eighteen bits of information. Sixteen of these bits can be for data, and two bits can be for error-correcting code (ECC). Four clock edges can transfer a total of sixty-four bits of data and eight ECC bits.

The ECC can be a correction scheme using single error correct- double error detect- single four-bit nibble error detect (SEC-DED-S4ED). A nibble is four consecutive bits. Eighteen nibbles may be provided in a 72-bit quantity covered by the SEC-DED-S4ED scheme. For each such 72-bit quantity, the SEC-DED-S4ED scheme can correct any single bit error, detect any double-bit error, and detect any nibble error. That is, the scheme can detect any error within a nibble. Since a nibble is four bits, the scheme can detect all 1-bit, 2-bit, 3-bit and 4-bit errors within a single nibble. An advantage of the SEC-DED-S4ED scheme in memory systems is that it can be used to detect entire 4-bit wide DRAM part failures. In one implementation, four bits of data transferred on four consecutive clock edges over any given data link are treated as a "nibble." The SEC-DED-S4ED scheme is applied to detect any failure of a data link.

Transfer of Quadword Over Multiple Clock Cycles

Figure 3:
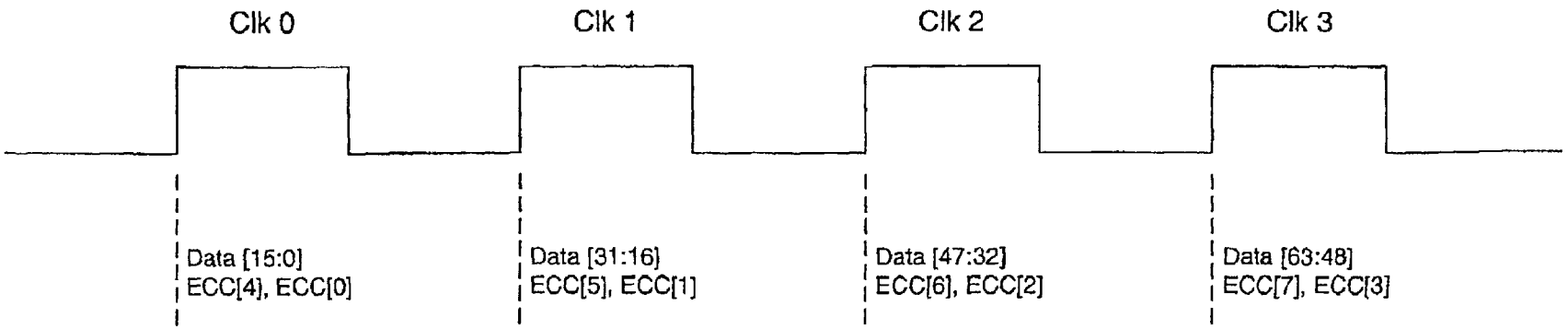
FIG. 3 illustrates an exemplary transfer of a quadword over multiple clock cycles, according to an embodiment of the present invention.

FIG. 3 illustrates an exemplary transfer of a quadword over multiple clock cycles, according to an embodiment of the present invention. The quadword comprises sixty-four bits of data (Data[63:0]) and eight bits of error-correcting code (ECC[7:0]). As described herein, all transfers of data and information over communication links 12 are in units of quadwords and are covered by error-correcting code (ECC).

As depicted, these bits of data and error-correcting code are transferred in equal-sized blocks over four clock cycles. The bits of data may be sent in order of increasing address, whereas the bits of error-correcting code may alternate.

Thus, at the edge of a first clock cycle (Clk 0), Data[15:0], ECC[4], and ECC[0] are transmitted. At the edge of a second clock cycle (Clk 1), Data[31:16], ECC[5], and ECC[L] are transmitted. At the edge of a third clock cycle (Clk 2), Data [47:32], ECC[6], and ECC[2] are transmitted. At the edge of a fourth clock cycle (Clk 3), Data[63:48], ECC[7], and ECC [3] are transmitted. Because each edge of the clock transfers eighteen bits of information (i.e., sixteen bits of data and two bits of ECC), four clock edges transfer a total of sixty-four bits of data and eight bits of ECC, which is a quadword.

Under the exemplary transfer technique depicted in FIG. 3, a packet header for a command or acknowledgement packet can be transferred over multiple clock cycles according to Table 4 below.

TABLE 4

| Packet Header | | | |
|---|---|---|---|
| Edge | Bits | Field | Description |
| 0 | 5:0 | Resvd | Reserved. Bits 1:0 should be zero. |
| 0 | 15:6 | ADDR[15:6:] | The ADDR field is used for header packets only and is reserved for acknowledgement packets. |
| 1 | 15:0 | ADDR[31:16] | The ADDR field contains different data depending on the type of command. For DMA engine writes, the ADDR field contains the address of the destination location. For memory copy writes, the ADDR field contains an offset from the base address of the sending node's send range, which is used as an offset from the base of the receiving node's receive range for the respective communication link. For administrative writes, the ADDR field is invalid and not used. |
| 2 | 5:0 | ADDR[37:32] | |
| 2 | 15:6 | Resvd | Reserved. |
| 3 | 15 | TYP | Identifies type of packet: 1 = Command packet, 0 = acknowledgement packet. |
| 3 | 14:12 | CMD | Command type. See Table 5 for encoding and command descriptions |
| 3 | 11:10 | TAG | A sequence tag that allows association of an acknowledgement with a command. |
| 3 | 9:8 | Resvd | Reserved. |
| 3 | 7:0 | FLAGS | Command Flags/Acknowledgement Flags. The meaning of the FLAG field differs depending on whether the packet is command packet or a acknowledgement packet. See Table 6 and Table 7. |

Exemplary values for various fields of a packet header are provided in Tables 5–7 below. Table 5 provides values for a command (CMD) field of the packet header. Tables 6 and 7 provide values for a command flag (CMD FLAG) field and an acknowledge flag (ACK FLAG) field of the packet header, respectively.

TABLE 5

| Commands | |
|---|---|
| CMD | Command Description |
| 000 | Idle. |
| 001 | DMA engine write: 64 bytes (8 quadwords) of data. |
| 010 | Administrative write: 8 bytes (1 quadword) of data. |
| 011 | Memory copy write: 64 bytes (8 quadwords) of data. |
| 100 | BIST: 64 bytes (8 quadwords) of data. |
| 101-111 | Reserved. |

TABLE 6

Command Flags

| CMD FLAG | Field | Description |
|---|---|---|
| 7 | INTDST/ BRCST | This command flag has different meanings for different types of commands. For DMA engine write command, this field functions as a flag to interrupt the destination node (INTDST). This flag will be set for the last link DMA write packet for a XCB that has INTDST set. Note that the Administrative write command does not set INTDST field since the command itself encodes this. For memory copy write command, this field functions as a flag to broadcast (BRCST) and write to a particular broadcast receive range at the destination. |
| 6:5 | Reserved | Reserved. |
| 4 | RSTCNT | Reset the Remote Receive Counter. |
| 3:0 | INCCNT | Count (in 64 byte units) to increment the Remote Receive Counter. Used only for the DMA engine write command; reserved for all other commands. |

TABLE 7

Acknowledgement Flags

| ACK FLAG | Field | Description |
|---|---|---|
| 7 | ECCUERR | ECC uncorrectable error. |
| 6 | ECCCERR | ECC correctable error. |
| 5 | PROTERR | Protocol error. |
| 4 | OVF | Overflow. |
| 3 | PRCTVIOL | Protection violation. |
| 2 | BTSTERR | BIST error. |
| 1 | SOFTWD | Software watchdog. |
| 0 | ADMNACK/ LNK_EN | This acknowledgement flag has different meanings for different types of commands. For administrative writes, this field functions as an administrative acknowledgement (ADMNACK) for admin packets. For BIST, this field functions as a LNK_EN flag for BIST packets. The LNK_EN bit is 1 has a value of "1" if the LNK_EN bit is 1 in a link configuration register. Reserved for all other commands. |

Memory Copy Write

Figure 4:
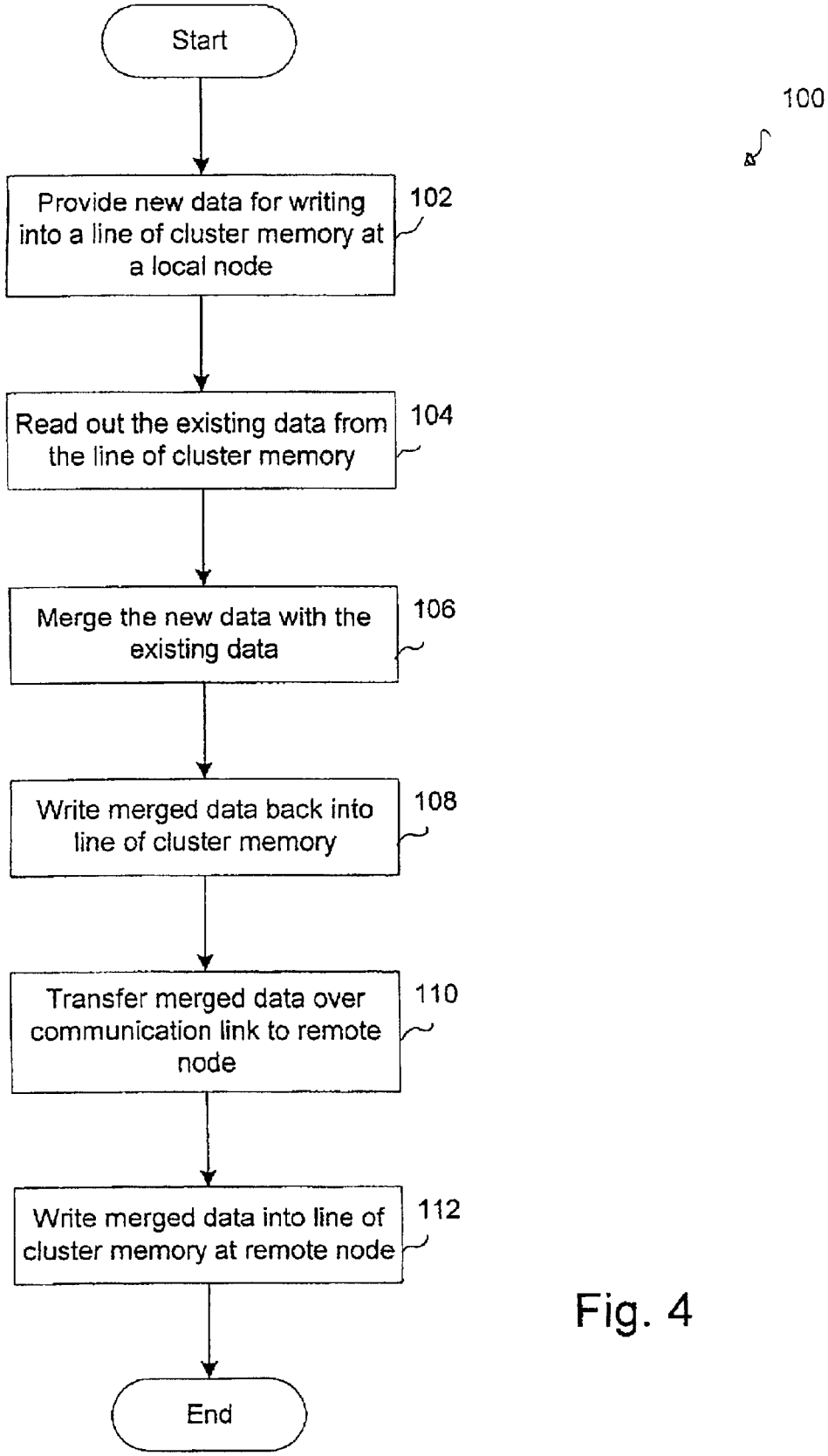
FIG. 4 is a flowchart for an exemplary method for communicating data, according to an embodiment of the present invention.

FIG. 4 is a flowchart for an exemplary method 100 for communicating data, according to an embodiment of the present invention. Method 100 may correspond to the operation within interconnect system 10 when there is a communication for a memory copy write.

Method 100 begins at step 102 where new data is provided for writing into a particular line of cluster memory 18 at a local node 14. As described herein, each cluster memory 18 may comprise a plurality of lines of memory of the same predetermined size (e.g., sixty-four bytes). The new data may be smaller than an entire line of memory, and thus, only be desirably written into a portion of the target line. Other data may already exist or be stored within the target line.

At step 104, the existing data from the entire line of memory is read from cluster memory. At step 106, the new data is merged with the existing data. That is, the new data may replace some of existing data, but other existing data remains intact. At step 108, the merged data (comprising new data and portions of the previously existing data) is written back into the particular line of cluster memory.

At step 110, the merged data is transferred from the local node to a remote node via a communication link 12 using the link protocol. In one embodiment, step 110 may be performed in parallel with step 108. Communication is in the form of quadwords, each of which can be of the same predetermined sized (e.g., sixty-four bits of data and eight bits of ECC). In one embodiment, for the merged data, eight quadwords can be used for transfer, with each quadword being sent in a separate clock cycle.

At step 112, the merged data is written into a line of cluster memory 18 at the remote node 14, thus mirroring the new data at the remote node. Afterwards, method 100 ends.

Accordingly, embodiments of the present invention provide a communication link and associated link protocol which are especially suitable for a specialized storage system architecture with a cluster configuration. That is, the communication link and associated protocol optimize and improve the performance of the specialized storage system architecture.

Although particular embodiments of the present invention have been shown and described, it will be obvious to those skilled in the art that changes or modifications may be made without departing from the present invention in its broader aspects, and therefore, the appended claims are to encompass within their scope all such changes and modifications that fall within the true scope of the present invention.

What is claimed is:

1. A method for communicating data in a data storage system, the data storage system comprising a plurality of interconnected nodes, each node having a respective cache memory comprising a plurality of cache lines, each cache line having the same predetermined size, the method comprising:

providing new data for writing into a portion of a particular cache line in a memory region of a cache memory located at a local node, wherein data written to the memory region are mirrored to at least another memory region in at least another cache memory located at a remote node;

reading out existing data from the particular cache line in the memory region of the cache memory located at the local node;

merging the new data with the existing data;

writing the merged data into the particular cache line in the memory region of the cache memory at the local node; and transferring the merged data over a communication link to the remote node for writing into said another memory region in said another cache memory located at the remote node.

2. The method of claim 1, wherein said transferring comprises issuing a memory copy write command over the communication link.

3. The method of claim 1, wherein said transferring comprises issuing a command packet from the local node to the remote node over the communication link, the command packet containing the merged data.

4. The method of claim 1, further comprising writing the merged data into a corresponding cache line of said another cache memory at the remote node.

* * * * *